United States Patent
Gusler et al.

(10) Patent No.: US 7,093,287 B1
(45) Date of Patent: Aug. 15, 2006

(54) METHOD AND SYSTEM FOR BUILDING DYNAMIC FIREWALL RULES, BASED ON CONTENT OF DOWNLOADED DOCUMENTS

(75) Inventors: Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 09/687,100

(22) Filed: Oct. 12, 2000

(51) Int. Cl.
*G06F 9/00* (2006.01)
*G06F 7/00* (2006.01)
*G06F 15/16* (2006.01)

(52) U.S. Cl. .................. 726/13; 707/100; 709/229
(58) Field of Classification Search .......... 713/201
See application file for complete search history.

(56) References Cited

U.S. PATENT DOCUMENTS

| | | | | |
|---|---|---|---|---|
| 5,678,041 A * | 10/1997 | Baker et al. | ............... | 707/9 |
| 5,706,507 A | 1/1998 | Schloss | ............... | 395/615 |
| 5,835,726 A | 11/1998 | Shwed et al. | ............ | 395/200.59 |
| 5,867,651 A | 2/1999 | Dan et al. | ............ | 395/200.33 |
| 5,878,231 A | 3/1999 | Baehr et al. | ............ | 395/200.75 |
| 5,898,830 A | 4/1999 | Wesinger, Jr. et al. | .. | 395/187.01 |
| 6,041,355 A | 3/2000 | Toga | ............... | 709/227 |
| 6,336,117 B1 * | 1/2002 | Massarani | ............... | 707/100 |
| 6,389,472 B1 * | 5/2002 | Hughes et al. | ............ | 709/229 |
| 6,539,430 B1 * | 3/2003 | Humes | ............... | 709/225 |
| 6,550,012 B1 * | 4/2003 | Villa et al. | ............... | 726/11 |
| 6,662,241 B1 * | 12/2003 | Bauer et al. | ............... | 710/8 |
| 6,684,329 B1 * | 1/2004 | Epstein et al. | ............ | 713/150 |
| 6,886,099 B1 * | 4/2005 | Smithson et al. | ............ | 726/24 |
| 2003/0231207 A1 * | 12/2003 | Huang | ............... | 345/752 |

OTHER PUBLICATIONS

Webopedia definition of the work "CRON", http://www.webopedia.com/TERM/C/cron.html.*

* cited by examiner

*Primary Examiner*—Kim Vu
*Assistant Examiner*—Brandon Hoffman
(74) *Attorney, Agent, or Firm*—Duke W. Yee; David A. Mims, Jr.; Hope Shimabuku

(57) ABSTRACT

A method for filtering incoming data from an external computer network is provided. This method includes scanning the contents of incoming data for pre-selected keyword(s) and allowing it to pass per standard service rules if its content does not contain the pre-selected keyword(s). If the incoming data does contain pre-selected keywords, it is blocked and added to a "known-block" filtering table. Once added to the filtering table, the site will automatically be blocked in the future without having its contents scanned again for pre-selected keywords.

13 Claims, 2 Drawing Sheets

METHOD AND SYSTEM FOR BUILDING DYNAMIC FIREWALL RULES, BASED ON CONTENT OF DOWNLOADED DOCUMENTS

BACKGROUND OF THE INVENTION

1. Technical Field

The present invention is related to construction of firewalls to screen internal computer networks from the Internet. More specifically, the invention screens incoming data based on content.

2. Description of Related Art

Increased reliance on the Internet in recent years has created a new host of security problems for organizations wishing to exploit this resource. Examples of these problems include the infiltration of computer viruses into internal computer networks, and the downloading of indecent material onto individual workstations. To cope with these problems, organizations have developed several methods for monitoring and controlling the influx of data from the Internet into their internal networks. Each of these approaches has its strengths and weaknesses.

One popular method of filtering incoming Internet data is the use of a firewall, a selective gateway standing between the Internet and an internal computer network. Firewalls can be designed to prevent specific types of data from entering the internal network and have the advantage of providing a centralized point from which administrators can control the influx of data.

A common way of setting up a firewall is to manually insert the address of a particular Internet site into the filtering rules of the firewall. Once a site is listed in the filtering rules, the firewall will automatically prevent electronic documents from that site from entering the internal network. A primary advantage of this method is that specific, objectionable sites can be blocked with certainty. Unfortunately, this approach is also very labor intensive, as it requires administrators to first evaluate the content of an Internet site and then manually add it to the filtering rules. This process diverts administrators from the important job of managing an organization to the mundane job of monitoring Internet access by employees, students, or staff. In addition, the administrator cannot add a site to the filtering list unless he or she knows about it. Considering the size and dynamic nature of the Internet, the administrator is certain to remain several steps behind changes in Internet content.

Another approach is to have the firewall scan the content description language coming in from the Internet and check the tag information within the content description. The tags describe the elements of an electronic document and are used by browser programs to display data properly. If the firewall detects content descriptions that have been added to the filtering rules, the Internet document will automatically be blocked from entering the internal network. Such content filtering reduces the burden on administrators by allowing them to set more general filtering guidelines rather than manually adding individual sites to the filtering rules. A disadvantage of this type of content filtering is the processing burden created by scanning all incoming Internet traffic. Having to scan the content description of all incoming traffic and compare that content to the filtering rules requires considerable processing resources, which must be diverted from other uses.

In addition to firewalls, Internet content may be filtered by using a distributed network, in which Internet content is filtered at the workstation just before it is rendered by the browser. This approach essentially offloads processing tasks from the server onto the client computers, which can substantially degrade performance, especially if the clients are "thin," having little processing capability themselves. This type of setup generally does not work well in a corporate environment because of the performance degradation and logistical problems of having filtering code distributed among several client machines.

Therefore, an Internet filtering method that allows content to be screened at a central firewall, but does not require heavy processing loads or constant monitoring and input from an administrator, is desirable.

SUMMARY OF THE INVENTION

The present invention provides a method for filtering incoming data from an external computer network. This method includes scanning the contents of incoming data for pre-selected keyword(s) and allowing it to pass per standard service rules if its content does not contain the pre-selected keyword(s). If the incoming data does contain pre-selected keywords, it is blocked and added to a "known-block" filtering table. Once added to the filtering table, the site will automatically be blocked in the future without having its contents scanned again for pre-selected keywords.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
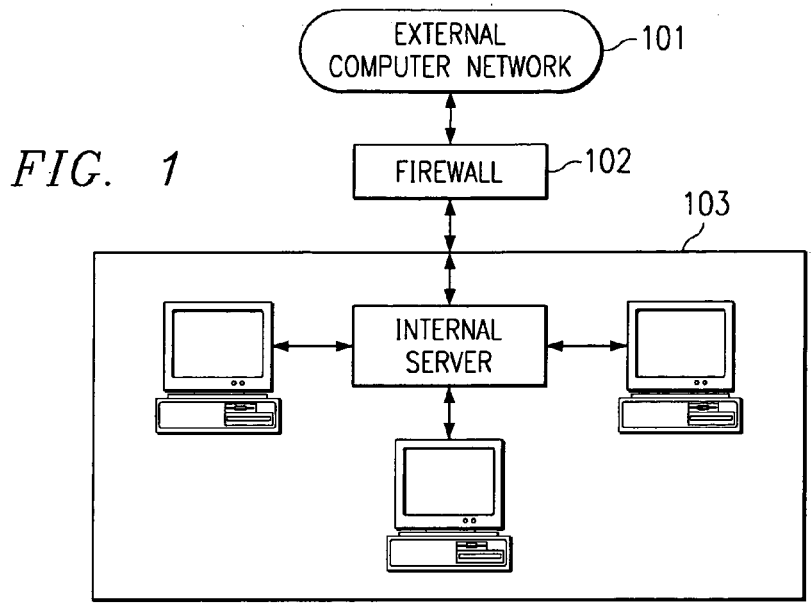
FIG. 1 depicts a block diagram illustrating the relationship between an external computer network, a firewall, and an internal computer network.

With reference now to FIG. 1, a block diagram illustrating the typical relationship between an external computer network, a firewall, and an internal computer network is depicted. The purpose of the firewall 102 is to act as a selective gateway controlling the flow of information between the external 101 and internal 103 computer networks. The firewall 102 can be designed to prevent users of the internal network 103 from accessing inappropriate material from the external network 101.

Figure 2:
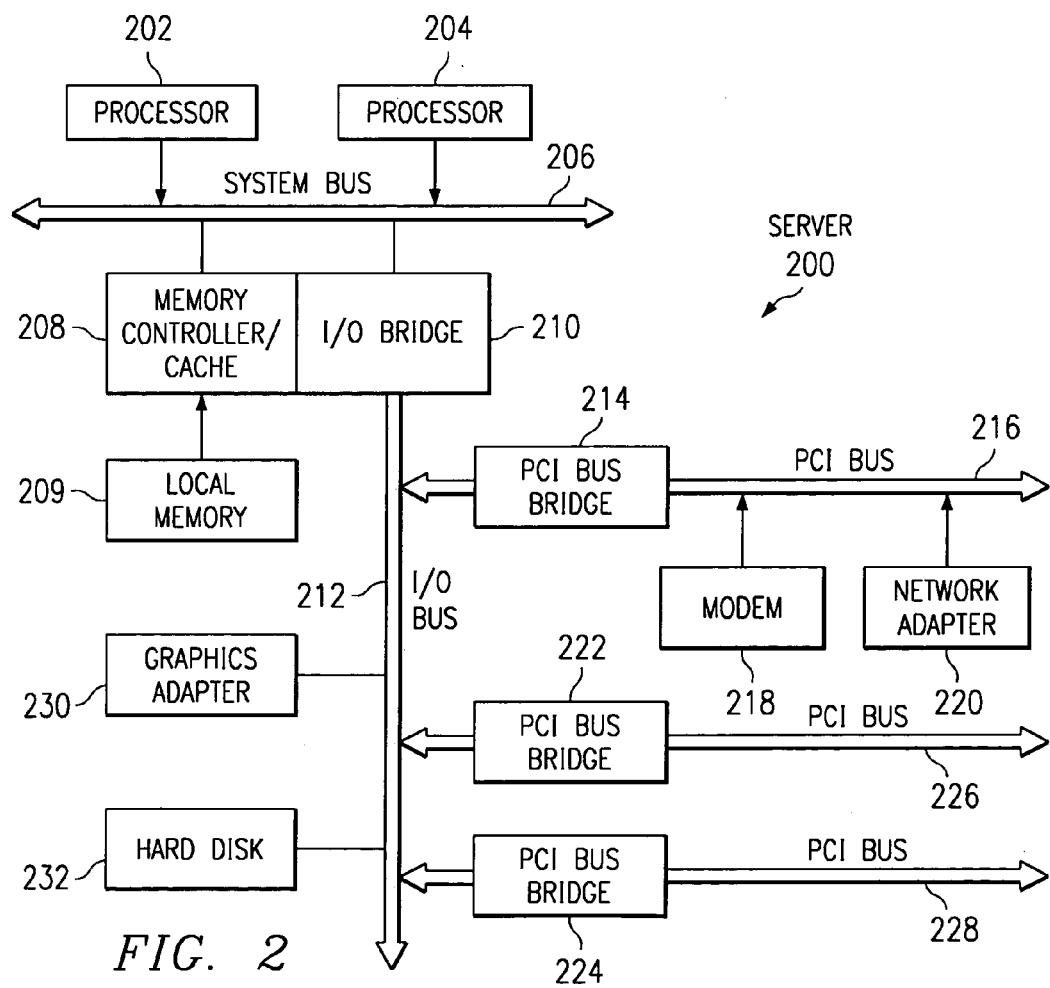
FIG. 2 depicts a block diagram of a data processing system which may be implemented as a server, in accordance with the present invention.

Referring to FIG. 2, a block diagram of a data processing system which may be implemented as a server is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
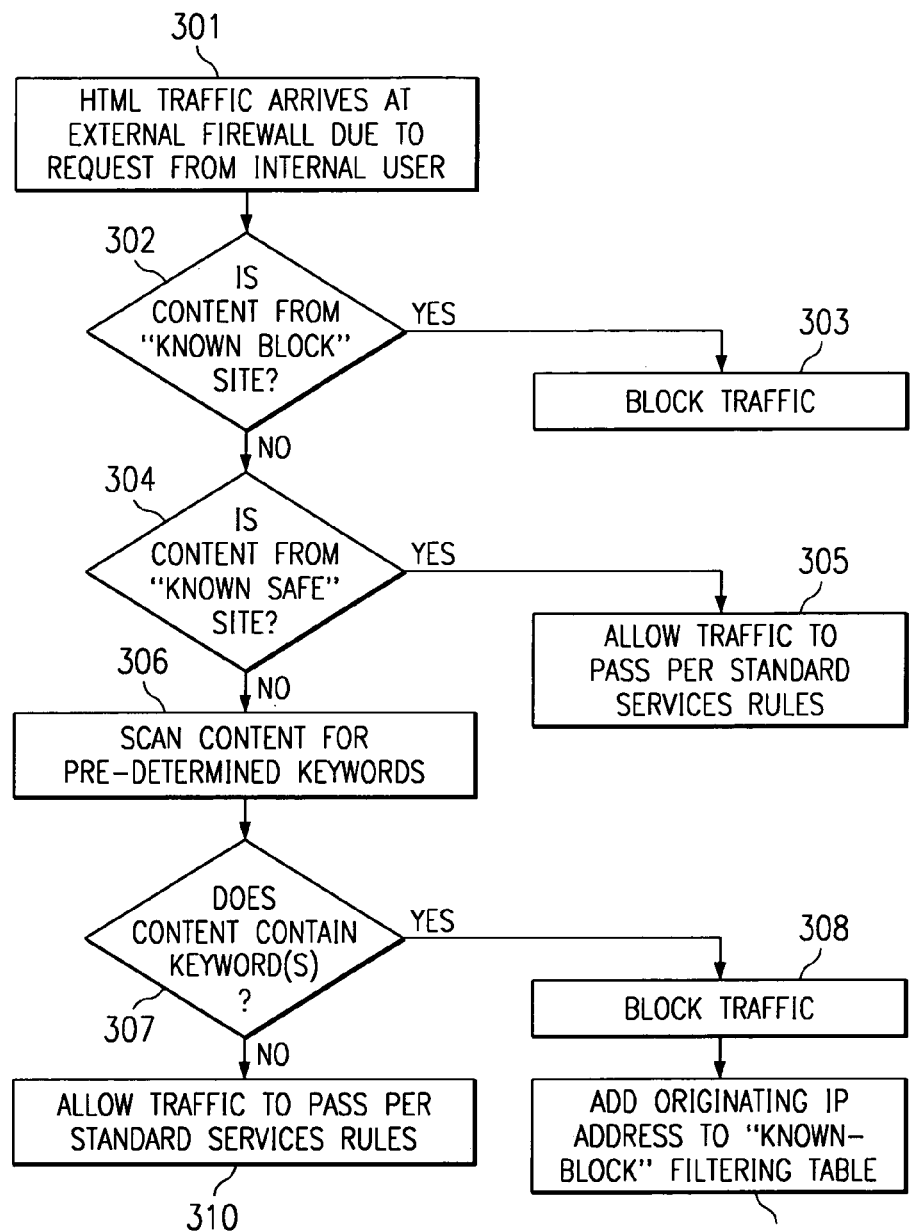
FIG. 3 depicts a flowchart illustrating the operation of dynamic firewall rules in accordance with the present invention.

With reference to FIG. 3, a flowchart illustrating the functioning of a dynamic firewall is depicted in accordance with the present invention. In this example, HTML (Hyper Text Markup Language) documents from an external computer network arrive at the firewall due to a request from an internal user (step 301). The next step is to determine if the HTML document originated from a site already listed in a filtering table of "known-block" sites (step 302). "Known-block" would refer to any specific site that was already known to contain inappropriate material. If the document is from a "known-block" site, then it is blocked from entering the internal network (step 303).

In one embodiment of the invention, if the document is not from a "known-block" site, the next step is to determine if it is from a "known-safe" site (step 304). "Known-safe" would refer to specific sites that administrators knew to be free of objectionable material or sites that are vital to organizational operations, for example, suppliers. If the document is from a "known-safe" site, it is allowed to pass per standard service rules without having its content scanned (step 305).

If the document is not from a "known-safe" site, the next step is to scan the contents for keywords that have been pre-selected by an administrator (steps 306 and 307). In prior art, when a HTML document is scanned, the contents are determined by looking at the tags in the description language. The tags describe the elements of a document and are used by browser programs to display data properly, but they are not part of the text of the document. The present invention goes a step further than the prior art and actually scans the text fields within the document itself, which provides a more accurate guide to content.

If the document does contain pre-selected keywords, it is blocked (step 308). In addition, once a document has been identified as containing pre-selected keywords, its originating address is automatically added to the filtering table of "known-block" sites (step 309). In the future, any document originating from that address will automatically be blocked by the firewall, without the need to scan its contents again, thus reducing the processing load on the system. Adding the site address to the "known-block" filtering table can be done using PERL or any strong text parsing language. This automatic process reduces the burden on administrators, who do not have to manually add sites to the firewall rules.

The updated filtering table can be added to the firewall instance through periodic refreshes, at intervals ranging, for example, from once a week to once an hour, depending on the needs of the organization in question. The instance is the running copy of the firewall loaded into memory, and must be refreshed to incorporate the new rules. The system can refresh the firewall instance by means of a timed job on a Windows platform, a cron job on a UNIX platform, or the equivalent on any other operating system which would be used for a firewall host.

If the HTML document does not contain any pre-selected keywords, it will pass into the internal network per standard service rules (step 310).

It should be pointed out that in addition to HTML documents, the present invention also applies to computer documents written in other languages, such as, for example, XML (Extensible Markup Language).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for filtering incoming data from an external computer network, comprising:

a firewall that is coupled to said external computer network;

a server computer system coupled to an internal computer network;

a plurality of clients that are coupled to said server computer system, said plurality of clients being unable to access said external computer network directly;

receiving, at said firewall, a document from said external computer network;

determining, by said firewall, whether said document is from a known blocked site;

in response to determining that said document is from a known blocked site, blocking, by said firewall, said document without scanning said document;

determining, by said firewall, whether said document is from a known safe site;

in response to determining that said document is from a known safe site, forwarding, by said firewall, said document to said server without scanning said document, all of said plurality of clients being permitted to access said forwarded document;

in response to determining that said document is not from a known blocked site or a known safe site, scanning, by said firewall, text fields included in said document for pre-selected keyword(s);

blocking, by said firewall, the document if any of said text fields include content that contains pro-selected keywords;

said server computer system being prohibited from receiving said document in response to said document being blocked; and indicating that a site that sent said document is a known blocked site by adding, by said firewall, the address of said site to a filtering table.

2. The method according to claim 1, wherein the document is allowed to pass per standard service rules if the content does not contain pre-selected keyword(s).

3. The method according to claim 1, further comprising storing an indication in said filtering table of each known safe site that can be passed per standard service rules without having to be scanned for pre-selected keywords.

4. The method according to claim 1, wherein the step of indicating that a site that sent said document is a known blocked site by adding, by said firewall, the address of a site to a filtering table further comprises adding the address of the site to a "known-block" table when said site has sent a document that includes said pre-selected keywords so that the site will be blocked in the future without having its contents scanned for pre-selected keywords.

5. The method according to claim 1, wherein addition of a site to the filtering table is implemented using a strong text parsing language.

6. The method according to claim 1, wherein the instance of the filter is periodically refreshed to enact the updated filtering tables.

7. A computer program product in a computer readable medium for use in a data processing system for filtering incoming data from an external computer network, the computer program product comprising:

a firewall that is coupled to said external computer network;

a server computer system coupled to an internal computer network;

a plurality of clients that are coupled to said server computer system, said plurality of clients being unable to access said external computer network directly;

instructions for receiving, at said firewall, a document from said external computer network;

instructions for determining, by said firewall, whether said document is from a known blocked site;

in response to determining that said document is from a known blocked site, instructions for blocking said document without scanning said document;

instructions for determining, by said firewall, whether said document is from a known safe site;

in response to determining that said document is from a known safe site, instructions for forwarding said document to said server without scanning said document, all of said plurality of clients being permitted to access said forwarded document;

in response to determining that said document is not from a known blocked site or a known safe site, instructions for scanning, by said firewall, text fields included in said document for pre-selected keyword(s);

instructions for blocking, by said firewall, the document if any of said text fields include content that contains pre-selected keywords;

said server computer system being prohibited from receiving said document in response to said document being blocked; and instructions for indicating a site that sent said document is a known blocked site by adding, by said firewall, the address of said site to a filtering table.

8. The computer program product according to claim 7, further comprising instructions for allowing the document to pass per standard service rules if the content does not contain pre-selected keyword(s).

9. The computer program product according to claim 7, further comprising instructions for storing an indication in said filtering table of each known safe site that can be passed per standard service rules without having to be scanned for pre-selected keywords.

10. The computer program product according to claim 7, wherein the instructions for indicating that a site that sent said document is a known blocked site by adding, by said firewall, that address of said site to a filtering table further comprises adding the address of said site to a "known-block" table when said site has sent a document includes said pre-selected keywords so that the site will be blocked in the future without having its contents scanned for pre-selected keywords.

11. The computer program product according to claim 7, wherein the instructions for addition of a site to the filtering table are implemented in a strong text parsing language.

12. The computer program product according to claim 7, wherein the instance of the filter is periodically refreshed to enact the updated filtering tables.

13. A system for filtering incoming data from an external computer network, the system comprising:

a firewall that is coupled to said external computer network;

a server computer system coupled to an internal computer network;

a plurality of clients that are coupled to said server computer system, said plurality of clients being unable to access said external computer network directly;

said firewall for receiving a document from said external computer network;

said firewall for determining whether said document is from a known blocked site;

in response to determining that said document is from a known blocked site, said firewall for blocking said document without scanning said document;

said firewall for determining whether said document is from a known safe site;

in response to determining that said document is from a known safe site, said firewall for forwarding said document to said server without scanning said document, all of said plurality of clients being permitted to access said forwarded document;

in response to determining that said document is not from a known blocked site or a known safe site, said firewall for scanning text fields included in said document for pre-selected keyword(s);

said firewall for blocking the document if any of said text fields include content that contains pre-selected keywords;

said server computer system being prohibited from receiving said document in response to said document being blocked; and said firewall for indicating that a site that sent said document is a known blocked site by adding the address of said site to a filtering table.

* * * * *